(12) United States Patent  (10) Patent No.: US 7,974,081 B2
Daley, III  (45) Date of Patent: *Jul. 5, 2011

(54) BAG COMPUTER COMPUTING UNIT PANEL

(76) Inventor: Charles A. Daley, III, Rawai (TH)

( * ) Notice: Subject to any disclaimer, the term of this patent is extended or adjusted under 35 U.S.C. 154(b) by 11 days.

This patent is subject to a terminal disclaimer.

(21) Appl. No.: 12/458,917

(22) Filed: Jul. 28, 2009

(65) Prior Publication Data

US 2009/0284908 A1 Nov. 19, 2009

Related U.S. Application Data

(63) Continuation-in-part of application No. 11/796,920, filed on May 1, 2007, now abandoned.

(60) Provisional application No. 61/188,621, filed on Aug. 12, 2008.

(51) Int. Cl.
*G06F 1/16* (2006.01)
(52) U.S. Cl. .................. 361/679.03; 206/320
(58) Field of Classification Search ............. 361/679.03, 361/679.55; 206/320
See application file for complete search history.

(56) References Cited

U.S. PATENT DOCUMENTS

| | | | | |
|---|---|---|---|---|
| 5,222,642 A * | 6/1993 | Solarz | | 224/191 |
| 5,887,777 A * | 3/1999 | Myles et al. | | 224/578 |
| 6,116,418 A * | 9/2000 | Sadow | | 206/320 |
| 6,283,299 B1 * | 9/2001 | Lee | | 206/760 |
| 6,393,745 B1 * | 5/2002 | Miki | | 40/586 |
| 6,685,016 B2 * | 2/2004 | Swaim et al. | | 206/320 |
| 6,769,588 B2 * | 8/2004 | Zheng | | 224/576 |
| 6,956,614 B1 * | 10/2005 | Quintana et al. | | 348/373 |
| 6,986,447 B2 * | 1/2006 | Truong | | 224/275 |
| 7,048,163 B2 * | 5/2006 | Albert et al. | | 224/275 |
| 7,821,779 B2 * | 10/2010 | Daley, III | | 361/679.02 |
| 2004/0134813 A1 * | 7/2004 | Domotor | | 206/320 |
| 2005/0011920 A1 * | 1/2005 | Feng | | 224/275 |
| 2005/0103815 A1 * | 5/2005 | Lee et al. | | 224/275 |
| 2006/0113203 A1 * | 6/2006 | Daley | | 206/320 |
| 2006/0113213 A1 * | 6/2006 | Daley, III | | 206/576 |
| 2006/0163303 A1 * | 7/2006 | Trutanich | | 224/576 |
| 2007/0199844 A1 * | 8/2007 | Daley, III | | 206/320 |
| 2007/0201201 A1 * | 8/2007 | Daley, III | | 361/683 |
| 2008/0192421 A1 * | 8/2008 | Daley | | 361/681 |
| 2008/0273298 A1 * | 11/2008 | Daley | | 361/683 |
| 2009/0009476 A1 * | 1/2009 | Daley, III | | 345/168 |
| 2009/0009938 A1 * | 1/2009 | Daley, III | | 361/680 |
| 2009/0046416 A1 * | 2/2009 | Daley, III | | 361/679.55 |
| 2009/0107877 A1 * | 4/2009 | Daley, III | | 206/576 |
| 2009/0107878 A1 * | 4/2009 | Daley, III | | 206/576 |
| 2009/0141446 A1 * | 6/2009 | Daley, III | | 361/679.55 |
| 2009/0185342 A1 * | 7/2009 | Daley, III | | 361/679.27 |
| 2009/0190296 A1 * | 7/2009 | Daley, III | | 361/679.27 |
| 2009/0201637 A1 * | 8/2009 | Daley, III | | 361/679.29 |
| 2009/0225508 A1 * | 9/2009 | Daley, III | | 361/679.27 |

(Continued)

*Primary Examiner* — Lisa Lea-Edmonds

(57) ABSTRACT

The disclosed invention is a panel-like computer with physical and electrical connections enabling it to be connected to the interior front wall of a matching bag. The resulting bag computer may further includes: a bag with means to attach matching computer equipment components; a pivoting display panel located near the exterior top front of the bag front with its display facing away from the bag; a pivoting cover for the display panel; an optional input device, such as a keyboard, located near the exterior center of the bag front. The computing unit panel is mounted to the interior of the bag's front wall using a support structure which physically and electrically holds and aligns the bag and other computing equipment while forming a rigid front to assist storage of the exterior front mounted equipment.

27 Claims, 6 Drawing Sheets

U.S. PATENT DOCUMENTS

2009/0225509 A1* 9/2009 Daley, III ................. 361/679.29
2009/0236247 A1* 9/2009 Daley, III ..................... 206/320
2010/0193384 A1* 8/2010 Daley, III ..................... 206/320
2010/0220434 A1* 9/2010 Daley, III ................. 361/679.27

* cited by examiner

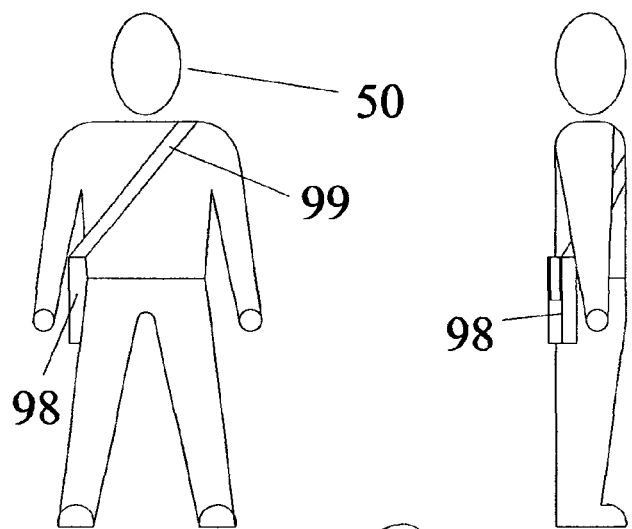
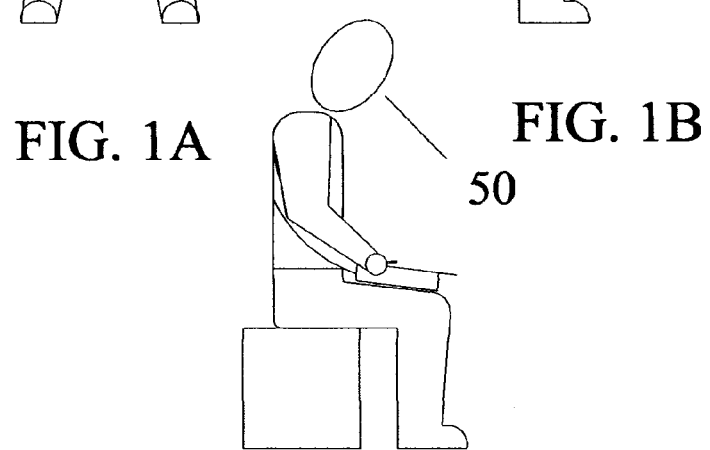
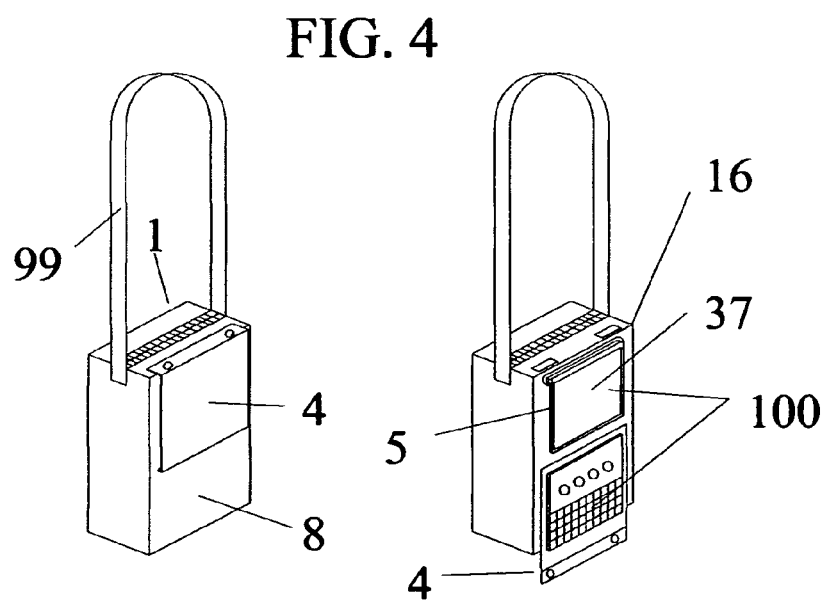

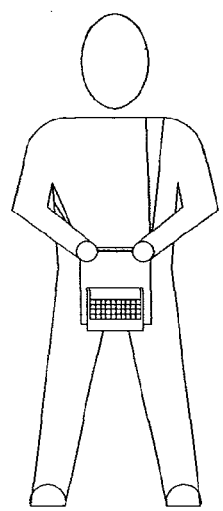
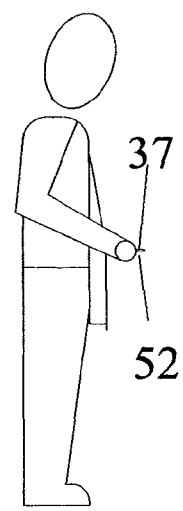
FIG. 5A  FIG. 5B
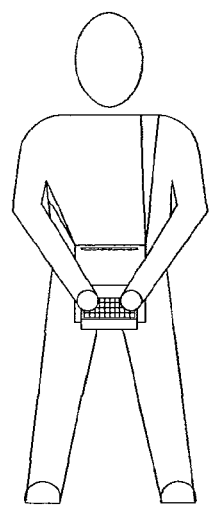
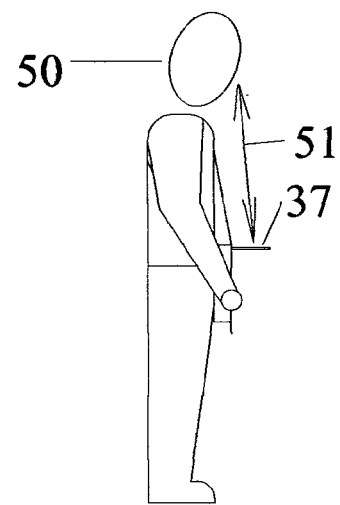
FIG. 6A  FIG. 6B
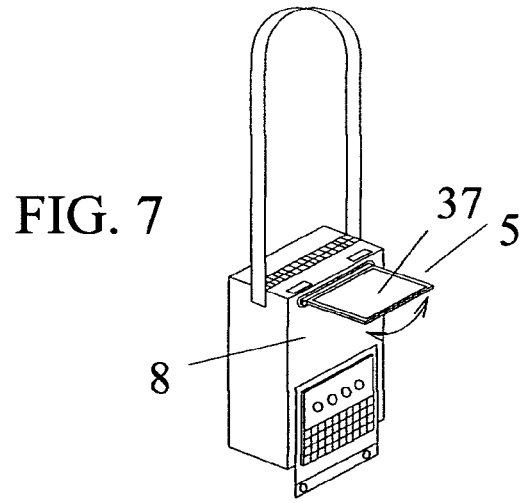
FIG. 7

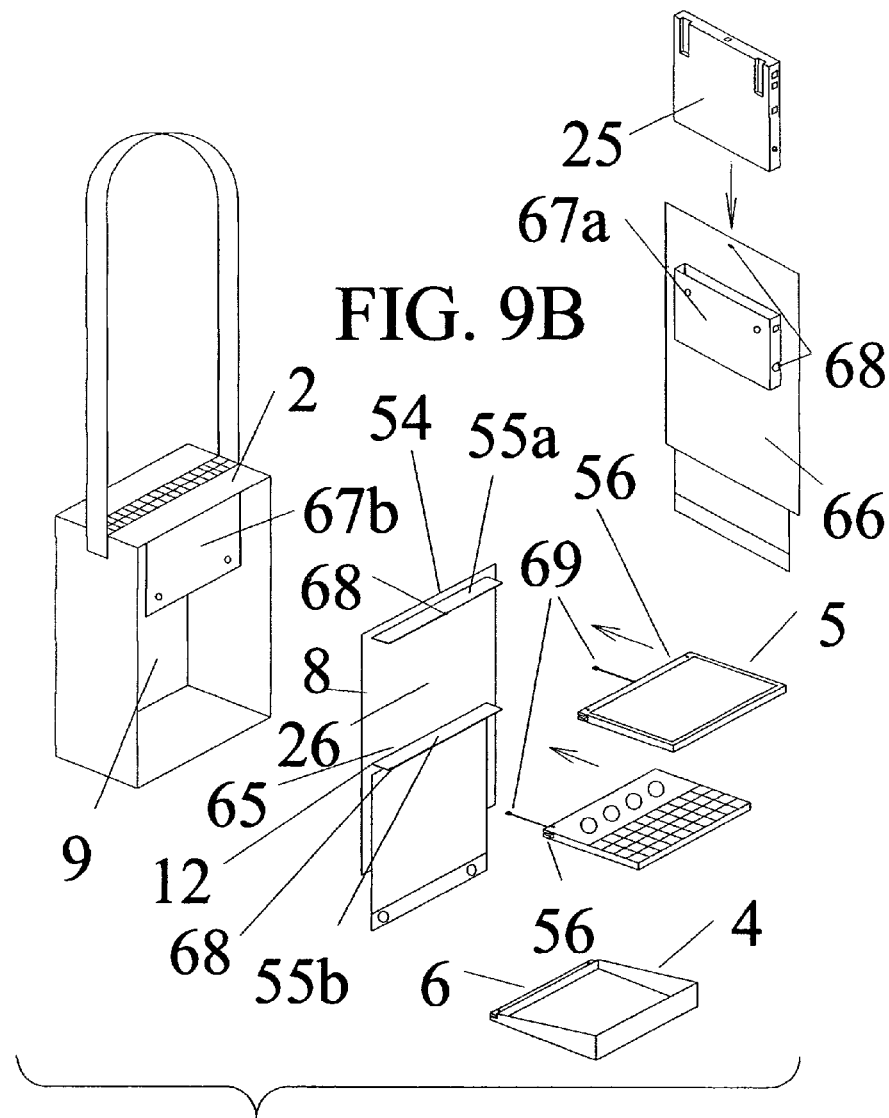

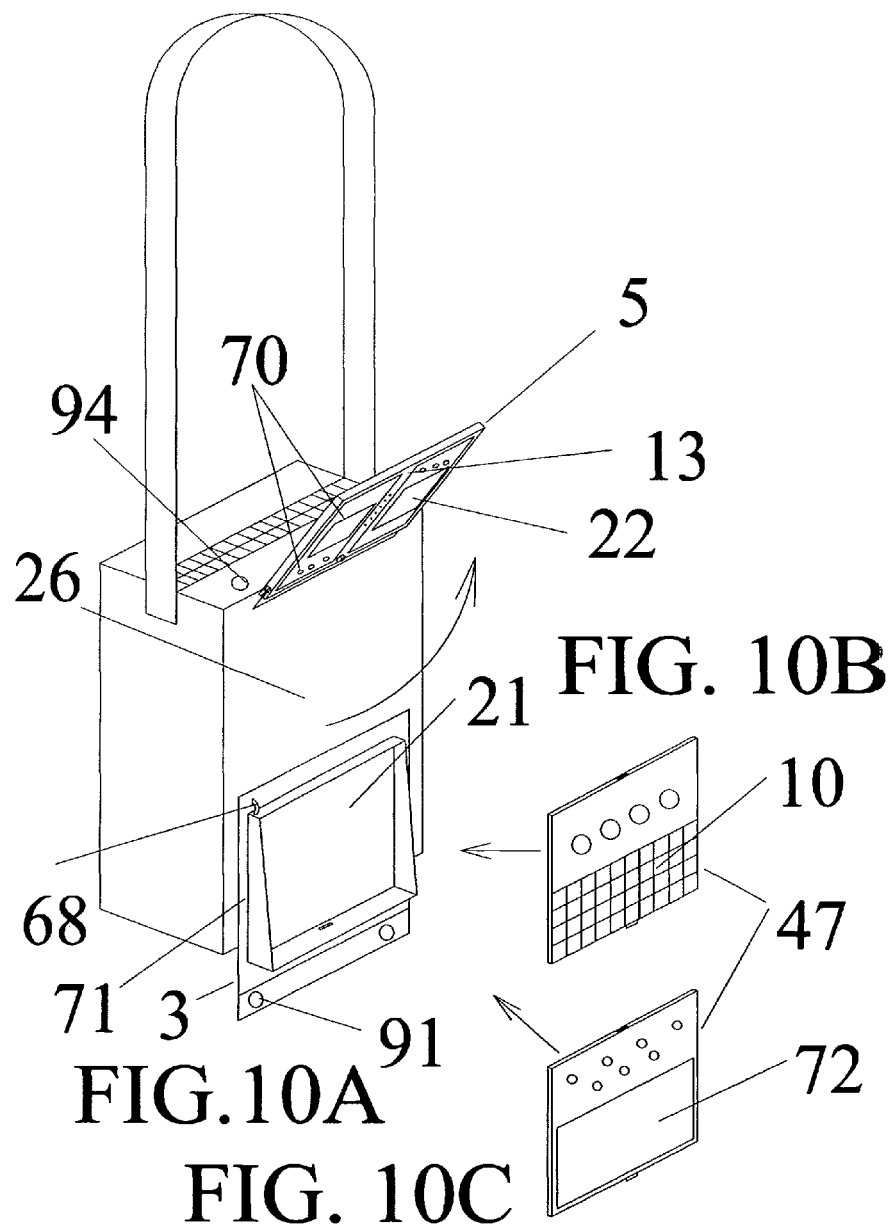

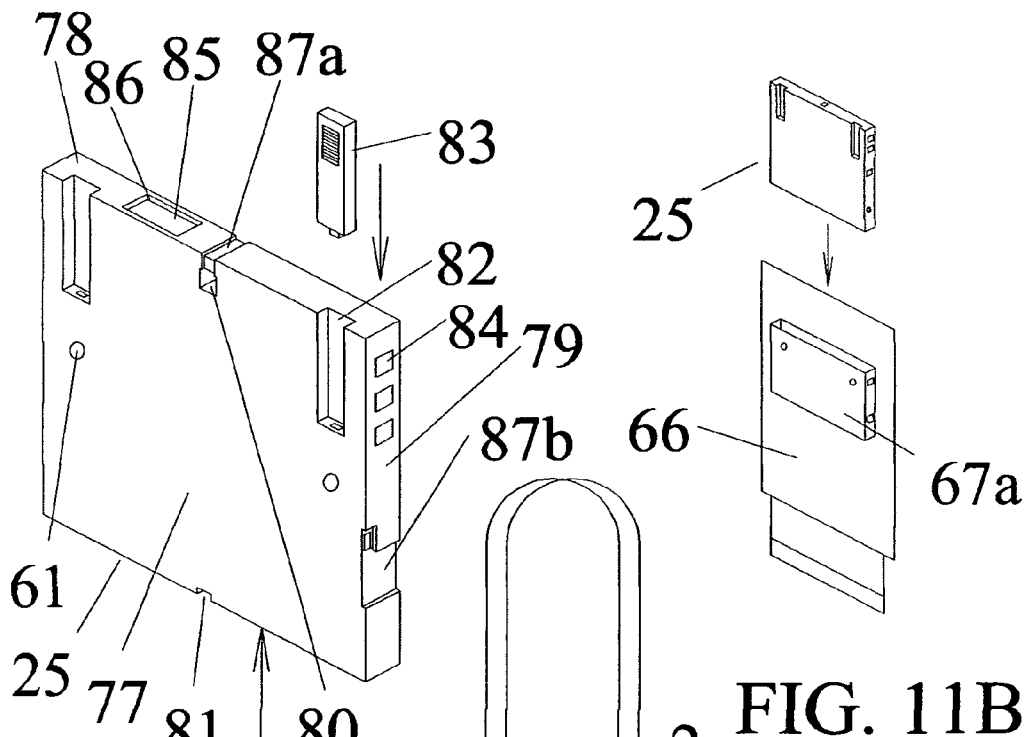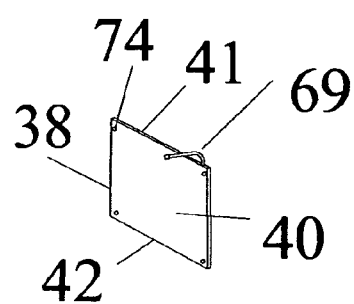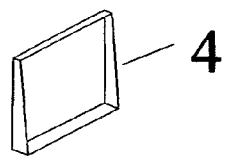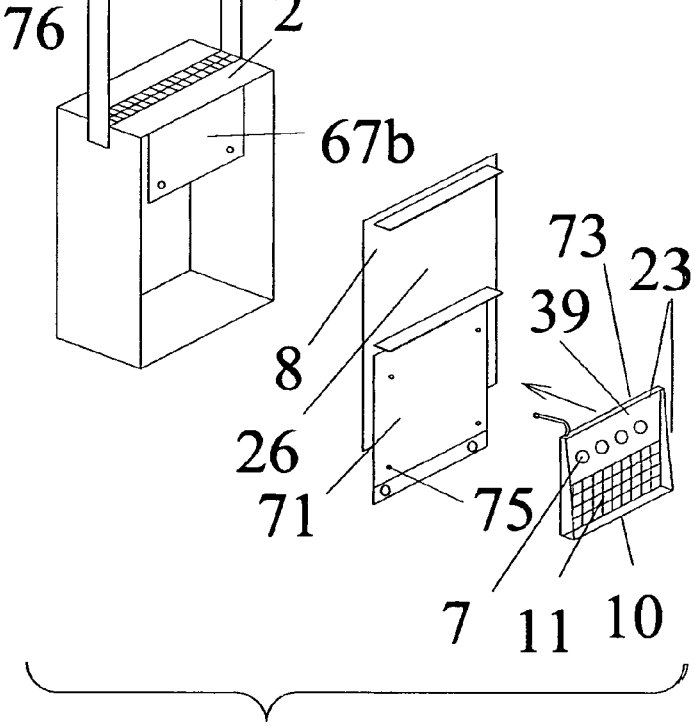

BAG COMPUTER COMPUTING UNIT PANEL

CROSS-REFERENCE TO RELATED APPLICATIONS

This application is a Continuation-In-Part and claims the filing benefit under 35 U.S.C. §120 of pending U.S. application Ser. No. 11/796,920, filed May 1, 2007 now abandoned and is incorporated herein by reference.

This application claims the filing benefit under 35 U.S.C. §119(e) of U.S. Provisional Application No. 61/188,621, filed on Aug. 12, 2008, the entire teachings of which are incorporated herein by reference.

TECHNICAL FIELD

The present invention relates to a computing unit panel component made for mounting to a bag which includes other computer components and is used for mobile use.

BACKGROUND OF THE INVENTION

There are many panel-like devices containing computing units. There are also many examples of computing unit panels being mounted to support structures on bags, vests, shirts or other wearable structures for mobile use. Electrical connections between computing unit panels mounted to the inside a bag and input/output devices mounted to the outside the bag are also common.

The computing unit panel described in this application is specialized to fit, align and support the component arrangement of the bag computer. These components may include, in addition to the computing unit panel, the bag, display panel and manual character input device (MCID) and these match each other physically and electrically. The components, themselves, have special features distinguishing them from other inventions. These features may include, for example, the position of the display panel on the bag, the edge attachment means of the display panel to the bag, the positioning of the MCID on the bag, the use of the cover flap for MCID mounting, etc. The computing unit panel must fit these other components as well as provide a rigid panel of appropriate size so the bag front can accept the display panel for storage.

The computing unit panel is a component of the bag computer described in application Ser. No. 11/796,920. Other applications dealing with the bag computer and its components include: Ser. Nos. 12/454,327, 12/387,594, 12/384,952, 11/799,011, 12/004,637, 12/216,650 and 12/216,651.

BRIEF SUMMARY OF THE INVENTION

The bag computer computing unit panel is a component of a bag computer. The bag computer consists of a bag, such as a shoulder bag, suited to wearing on the operator's body. The bag includes means for mounting a display panel and computing unit to the bag and may include means for mounting a manual character input device to the bag. The bag may include a cover flap. The interior of the bag is mostly storage space for general cargo.

The bag has a display panel which pivots on the bag on a horizontal axis near the top front of the bag by one panel edge. The display panel may store hanging down parallel to the bag's front wall with its display facing away from the bag. When in operation the display panel is pivoted away from the bag and into the line of sight of the operator/wearer. On the side of the display panel opposite the display there may be controls such as a pointing device or touch pad. There may be finger guides to assist in locating specific controls with the fingers without looking. The display panel is removable from the bag and includes an electrical connection which leads to the interior of the bag.

The bag may also have a cover which covers the display panel when it is stored. The cover may be a cover flap or rigid cover or a combination of the two and may be shaped to fit and protect the display panel.

The bag may also have attached on its exterior front a manual character input devices (MCID) such as a keyboard or electronic write pad. The panel like MCID may pivot on the bag on a horizontal axis by 1) pivotally attaching to the bag front by one edge or 2) attaching by its back side to the inside surface of the cover. In place of an MCID, there may be a rigid cover or there may be a MCID receptacle which may alternately accept a choice of MCID inserts, such as a keyboard or electronic write pad, for mounting to the bag. The MCID or MCID receptacle may include an electrical connection leading to the interior of the bag. The MCID, cover or MCID receptacle may be removable from the bag.

The bag computer computing unit is found in a panel-like computing unit panel. The computing unit panel is attached to the inside surface of the bag's front wall using a computing unit panel support structures which physically and electrically holds the panel to the bag and aligns it to the bag and outside mounted equipment. The computing unit panel may include connections, such as plugs or plugs and wires, for the display panel, MCID, removable memory, batteries or other peripherals. These plugs may be specialized to fit the computing unit panel to the bag and other computing equipment and serve to make the bag computer operate optimally.

BRIEF DESCRIPTION OF THE SEVERAL VIEWS OF THE DRAWING

FIG. 1A This figure shows a front view of the standing operator/wearer of the bag computer as a manikin wearing the bag computer in storage position.

FIG. 1B This figure shows a side view of the standing operator/wearer of the bag computer as a manikin wearing the bag computer in storage position.

FIG. 2 This is the bag computer in storage position with the cover closed and covering computer equipment mounted on the bag front.

FIG. 3 This is the bag computer with the cover open but with the display panel still against the bag front with its display facing out.

FIG. 4 This figure shows a front view of the sitting operator/wearer of the bag computer as a manikin wearing the bag computer while viewing the display panel and operating controls on the display panel back side with his fingers.

FIG. 5A This figure shows a front view of the standing operator/wearer of the bag computer as a manikin wearing the bag computer while viewing the display panel and operating controls on the display panel back side with his fingers.

FIG. 5B This figure shows a side view of the standing operator/wearer of the bag computer as a manikin wearing the bag computer while viewing the display panel and operating controls on the display panel back side with his fingers.

FIG. 6A This figure shows a front view of the standing operator/wearer of the bag computer as a manikin wearing the bag computer while viewing the display panel and typing with his fingers.

FIG. 6B This figure shows a side view of the standing operator/wearer of the bag computer as a manikin wearing the bag computer while viewing the display panel and typing with his fingers.

FIG. 7 This is the bag computer with the cover open and the display panel pivoted away from the bag front into the line of sight of the operator/wearer.

FIG. 9A This is an exploded view of the bag computer and its various components.

FIG. 9B This is a view of the inside surface of the bag front wall shown in FIG. 9A. It also shows the computing unit panel and the computing unit panel support structures.

FIG. 10A This is the bag computer with the cover open and the display panel pivoted open showing the back side of the display panel and a MCID receptacle for holding a MCID.

FIG. 10B This figure shows a keyboard as the input devices to be fitted to the MCID receptacle.

FIG. 10C This figure shows a electronic write pad as the input devices to be fitted to the MCID receptacle.

FIG. 11A This is an exploded view of the bag computer showing interior general cargo storage area and a means of mounting a MCID to the inside of a cover flap.

FIG. 11B This is a view of the inside surface of the bag front wall shown in FIG. 11A. It also shows the computing unit panel and the computing unit panel support structures.

FIG. 11C This is a view of the back side of a MCID made to mount by its back to the inside surface of the cover flap.

FIG. 11D This is a view of a cover made to mount by its back to the inside surface of the cover flap.

FIG. 12 This is a view of the computing unit panel and its various parts.

DETAILED DESCRIPTION OF THE INVENTION

Figures 8A, 8B:
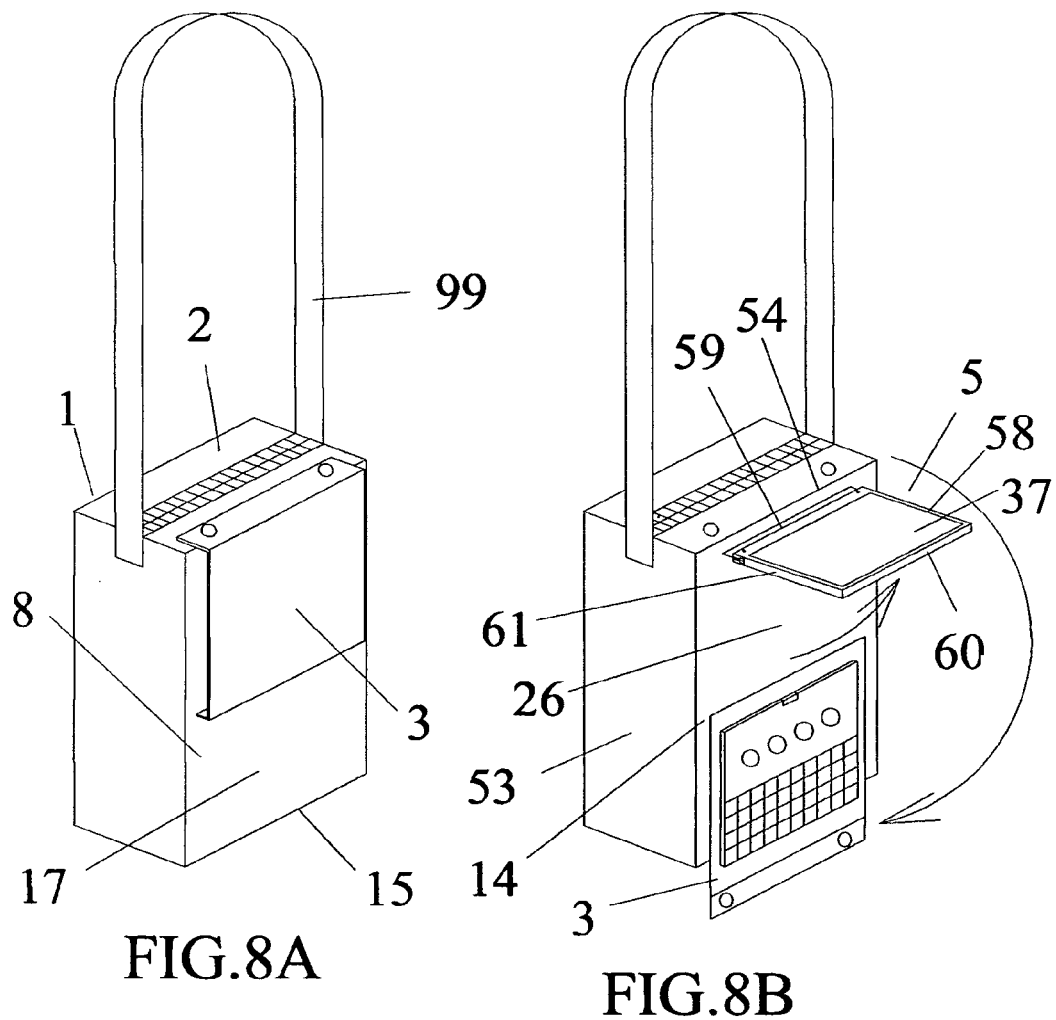
FIG. 8A This is the bag computer in storage position with the cover closed and covering computer equipment mounted on the bag front.
FIG. 8B This is the bag computer with the cover open and the display panel pivoted away from the bag front into the line of sight of the operator/wearer.

As shown in FIGS. 1A, 1B and 2, the bag computer is a combination of bag 1, computer and input/output devices that results in a mobile, self contained wearable computer. The bag is suspended from the operator's 50 body by a shoulder strap 99 so it can be carried normally or swung around in front of the operator for use. The input/output devices, found on the display panel and manual character input device (MCID) panel, are located on the outside of the bag's front wall so that they can be operated without accessing the interior of the bag. When the input/output devices are stored they are covered with a cover 4 on the bag's front wall 8 and the bag computer 98 appears to be a normal piece of apparel. Because the computer equipment, including the input output devices and the computing unit panel, are mounted to either the inside surface or outside surface of the bag's front wall, the majority of the bag's interior space, as defined by the bag walls, becomes a general cargo storage area, eliminating the need to carry separate computer and general cargo bags.

As shown in FIG. 3, when the cover 4 is opened the input/output computer equipment 100 is exposed for use. A display panel 5 may be removably and pivotally attached to the bag using a pivoting computer equipment mount so the panel can pivot along a horizontal axis. The display panel may be attached in this way to the area of the bag near the junction 16 of the front and top walls. In this location, the display panel is as close as possible to the operator's eyes in order to present the largest apparent display size possible. The display panel may pivot down over and parallel to the front wall of the bag with its display 37 facing away from the bag front. When covered, FIG. 2, this is the display panel storage position. When uncovered, FIG. 3, this position is good for sitting FIG. 4 and typing, even while still strapped to the operator's body, because both the display and keyboard are exposed to operator view. Instead of a keyboard, any manually operated input device (MCID) such as a keyboard, electronic write pad, may be substituted. Shown in FIGS. 5A, 5B and 7, from the stored position the display panel 5 can pivot up to a position approximately perpendicular to the bag front 8 for viewing the display 37 in the line of sight 51 of the operator 50 and manipulating display panel back mounted controls 52 while standing. FIGS. 6A and 6B show this position can also be used for typing while standing.

Shown in FIGS. 8A and 8B, the bag 1 used in the bag computer has a front wall 8 and opposite back wall, several side walls 53 connection the front and back wall (see 9 in interior view FIG. 9A), a top wall 2 with opening to access the interior and an opposite bottom wall. The opening would normally have a closure such as a zipper. Each wall has an inside and outside surface. The walls define an interior general cargo storage area for items not attached to the bag's front wall. The bag may have a shoulder strap 99 for carrying the bag and holding the bag in position on the operator for use. The strap may be removable and replaceable. The straps may be repositioned on the bag so the operator may wear the bag as a belly bag. The bag has a defined computer equipment storage area 26 toward the top end 54 of the outside of the bag's front wall. The storage area may be defined by a cover flap 3 of a size and shape to fit the computer equipment, such as the display panel, to be stored under the cover. The cover flap may be pivotally attached to the outside surface 17 of the bag's front wall near the center 14 or bottom end 15 of the bag's front wall.

As shown in FIGS. 8A and 8B, the bag computer's display panel 5 is thin and approximately rectangular in shape. The removable display panel has a front side 58 facing up when the input device is pivoted perpendicular to the bag's front wall, a back side (see 13 in FIG. 10A) opposite the front side, a proximal attachment edge 59 closest to the bag's front wall when it is pivoted perpendicular to the bag's front wall, a distal edge 60 opposite the proximal edge and two side edges 61. The display 37 is located on the display panel front side and oriented for viewing by the wearer when pivoted away from the bag's front side into operating position.

Shown in exploded view, FIGS. 9A and 9B, the display panel 5 may attach to and pivot on the bag by its proximal attachment edge using a top bag position pivoting computer equipment mount. A pivoting computer equipment mount (PCEM) is a fitting to removably attach a piece of computing equipment, such as the display panel, and bag together while allowing them to pivot relative to each other on a horizontal axis. The PCEM consists of one part 56 on the proximal attachment edge of the computer equipment, such as the display panel or manual character input device, and a matching part 55a and 55b on the outside of the bag front wall 8. A cover 4 or MCID receptacle (appearing substantially the same as a cover in this figure) may also be attachment by the attachment edge 6 to the bag using a PCEM.

A bag PCEM may be top bag position, PCEM 55a located near the top 54 of the bag's front wall and computer equipment storage area to allow a display panel to pivot near the corner of the top 2 and front bag wall 8. Instead or in addition, a PCEM may be a bottom bag position PCEM 55b located near the bottom 65 of the computer equipment storage area 26 near the center of the bag front between the top of the front wall and the pivoting attachment of the cover 12 to the front wall. The bottom bag position PCEM may be used to mount the MCID or cover and to allow it to pivot from storage to operating position. The top and bottom bag position PCEM may be identical and the display panel, MCID or other matching computer equipment may be mounted to either. Hence the display panel may be mounted near the center front of the bag and pivot up into the bag front computer equipment storage area with the display facing inward toward the bag front.

Shown with a view of the inside surface of the bags front wall, FIG. 9B, the bag may have a computing unit panel support structure 67a and 67b on the front wall inside surface 66. This holds and fits the computing unit panel 25 to the bag and aligns it to the equipment found on the outside of the bag's front wall and to any electrical connections and electrical connection openings 68 in the front wall and/or computing unit support structure leading between the inside mounted computing unit panel and the outside mounted display panel and, if present, a MCID.

Shown in FIG. 9A, there may be an electrical connection 69, such as a wire and plug, leading between the display panel and/or MCID on the exterior of the bag through the bag's front wall to the interior of the bag. There may be an electrical connection between the display panel and computing unit panel and/or a separate electrical connection between the MCID and the computing unit panel. The electrical connection may be of specific size shape and characteristics to match a computing unit mounted to the inside of the bag's front wall. The exterior to interior electrical connection or parts of it may be built into the display panel, MCID, MCID receptacle, bag front wall, PCEM, cover, computing unit panel, computing unit panel support structures or a combination of several of these.

Shown in FIGS. 10A, 10B, and 10C, the display panel has manual controls so that the computer can be operated from the display panel. A pointing device 22, for example, may be located on the display panel 5 back side 13 so that the display can occupy one entire side of the display panel. The controls can be used at the same time the display and bag are stabilized with the hands. The side of the display panel opposite the display 13 may be mostly touch pad so that it can have extensive controls. The back side touch pad may have one or more finger guides 70 over a touch pad to help align the operator's fingers to the touch pad without looking. The finger guides may be removable. The finger guide has a pattern of ridges and/or openings to guide the fingers to specific positions, corresponding to specific controls, on the touchpad which is underneath the finger guide. The finger guides may work with and align to programmed touchpad positions. The finger guide and programming for the touchpad may be changed together to fit particular operator needs.

On the outside surface of the bag there may be a pivoting cover, such as a flap 3, rigid shaped panel or a combination of the two, designed to fit, cover, conceal and protect the display and display panel while stored. The cover has an inside surface 71 which faces the bag front when it is in stored position. The cover may be attached near the center of the bag front. The cover, then, may define a computer equipment storage area 26 with the display near the top and the cover attached near the bottom of the storage area. The pivoting cover may be pivoted downward to open and expose the outside front mounted computer equipment for use.

For operation, the cover may be pivoted down and the display panel pivoted up so that the display can be viewed and the manual controls operated.

The pivoting cover may be shaped to form a receptacle 21 to hold a choice of removable MCID inserts 47, for example, a keyboard 10 or electronic write pad 72. A shaped cover, receptacle or MCID may be mounted by it attachments edge 41 to the bag's cover flap or a bag PCEM, especial a bottom position PCEM located near the bottom of the computer equipment storage area.

To hold a cover attached to the center front of the bag in the closed position, the cover may have one or more releasable attachments 91 near its distal end and matching attachments 94 on the bag's top wall or near the top of the bag front. The attachments may be hooks, snaps, magnets, for example, and there may be elastic in the flap. The flap may also have a flap to MCID attachment to hold the flap to the MCID so they can move as one.

The cover flap may have a manual character input device, molded cover or MCID receptacle 21 mounted directly to the inside surface of the cover by, for example, clamping through to a backing plate or by riveting or there may be a support structure such as a docking port, matching fittings, holes, stitching or other facilities on the cover flap inside surface to match and assist in removably holding the MCID/cover/receptacle to the cover flap.

The cover flap 3 may have provision, such as an opening 68 through the bag's front wall, for electrically connecting the input device to the bag's interior. Another example for provision for electrical connection may be a cover flap constructed of two layers of bag material with an opening 68 in one layer to gain access between the layers where equipment wiring may pass further to a hole for wiring to enter the interior of the bag.

Shown in FIGS. 11A, 11B, and 11C, the manual character input device (MCID) is thin and approximately rectangular in shape. The general shape of the device may be called its body 73. It has a front surface 39 facing away from the bag front when the input device is hanging parallel to the bag's front wall, a back surface 40 opposite the front surface, a proximal attachment edge 41 closest to the bag's top wall 2 when the input device is hanging parallel to the bag's front wall, a distal edges 42 opposite the proximal attachment edge and two side edges 38. Instead of the MCID, there may be a cover fitted to cover and protect the display panel or there may be a receptacle designed to accept and mount a removable input device such as a keyboard of electronic write pad.

If the manual character input device is a keyboard 10, it would be oriented for use from above by the wearer. It may be ten keys wide and this allows for full size keys 11 for typing while still keeping the keyboard size proportional to the average bag. The keyboard would be the width of the keys "a" to ";" on a standard QWERTY keyboard. Three or four rows may be included. Thumb keys 7 substitute for essential keys farther to the right and left on the standard keyboard (for example, space, return, shift, backspace, tab, change keyboard, camera or external communicator controls, etc). The result is a keyboard with standard ¾ inch keys and totaling about 8" wide. The key rows may have the standard offset or be inline.

The manual character input device may store over the display and it may be include alignment structures 23 to align the keyboard to the display panel to protect the display/computer while stored. These structures may be on any edge or the front of the input device and may include ridges or pins on the input device edges and may include spacers to keep the keys from being depressed when stored. The structures may be molded into the input device body. Including the input device, the alignment structures may form a box-like enclosure open on one side (the display side) that also serves as a cover for the display panel. The alignment structures may also touch the bag's front wall or display/computer hinge while closed to serve to protect the display from impact.

The MCID or cover (pictured in FIG. 11D) may be attached directly to the bag's front wall or to the inside surface of the cover 71 by its back using attachments 74 on its back or edges which are complementary to attachments 75 on the cover flap inside surface. Instead, the MCID or cover may attach by its attachment edge to a bag pivoting computer equipment mount. The back side and attachments of the MCID (pictured in FIG. 11C) are substantially the same as the back side of a cover for mounting by its back side to a cover flap.

There may be an electrical connection 69, such as a wire and plug, leading between the MCID and MCID receptacle on the outside of the bag through the bag's front wall to the interior of the bag. The electrical connection may be of specific size shape and characteristics to match a computing unit mounted to the inside of the bag's front wall.

The bag computer computing unit is removably attached to the inside of the bag's front wall 66. The computing unit may be a separate computing unit panel 25 that is not permanently attached to the display panel. The computing unit panel is of shape and size so that it may act as a rigid support for the bag's front wall 8 and render flat the storage area 26 on the outside of the bag's front wall so that the display and manual character input device may store against the bag front. The computing unit would have an electrical connection through the bag's front wall to the display panel and, if present, the manual character input device.

The computing unit panel 25 size and shape and/or attachments found on it are designed to fit a computing unit panel support structure 67a and 67b found on the inside surface 66 of the bag's front 8 and/or top walls 2. The support structure may be a holster, holster 67a and flap 67b, pocket, array of attachments or docking port of any sort which matches the computing unit panel and physically holds and aligns it to the inside of the bag's front wall, equipment mounted on the outside of the front wall and the provisions on the bag for electrical connections.

Shown in FIG. 12, the computing unit panel has a front side (hidden) adjacent to the bag's front wall when installed, an opposite back side 77, a top edge 78 nearest the bag's top when installed, an opposite bottom edge 76 and two side edges 79.

The computing unit panel has electrical connections for the outside mounted computer equipment such as a display and manual character input device, and other equipments which may be held in the bag such as auxiliary batteries, peripherals.

On any side or edge near the top of the computing unit panel there may be a display panel electrical connection 80, such as a plug or wire and plug, situated to connect and align with and designed to match the outside mounted display panel or an electrical wire leading from it. The computing unit panel may include one or more plugs with a recessed areas 87a, such as a groove, on, for example, its top or side edge to accommodate a matching plug so that the connecting electrical wire has room for slack so it will not break under stress and so that the computing unit panel shape is not substantially changed with or without the electrical connection in place.

On any side or edge near the bottom of the computing unit there may be a manual character input device electrical connection 81, such as a plug or wire and plug, situated to connect and align with and designed to match the outside mounted manual character input device or an electrical wire leading from it. Alternatively, the electrical connection may be located near the display panel electrical connection to simplify installation. The computing unit panel may include one or more plugs with a recessed areas 87b or groove on, for example, its top, bottom or side edge to accommodate a matching plug from the MCID so that the connecting electrical wire has room for slack so it will not break under stress and so that the computing unit panel shape is not substantially changed with or without the electrical connection in place. Side recessed areas and its plug may be configured to make the computer equipment wires bend about 90 degrees to provide slack in the connection.

Since the bag computer is meant for mobile use, "instant on" capability would be desirable. Instant on programming allows the computer to function within a few seconds and may not need to access any disk memory. To allow instant on, the computer may be provided with a very small "introductory operating system" which can load itself and an interactive choice of options shown in a picture on the display. The options may include starting Windows or some other "normal" operating system, starting television, starting telephone messaging or starting one or more programs located on removable memory inserts such as flash memory sticks. The removable memory may contain maps, pictures, reference material or other information along with very simple and quick loading program to access this information.

Hence, the computing unit panel may have one or more memory receptacles 82 for removable memory 83. The receptacles may be oriented to plug in from the top so that the thinnest dimension of the removable memory, its plug and memory receptacle match the thinnest dimension of the computer. Inserting the memory from the top also facilitates its installation. The receptacles may be slots, sockets or recessed areas in the computing unit panel so that the body shape is not substantially changed with or without the removable memory in place.

The removable memory 83 may be shaped or molded to fit the memory receptacle so that the outward shape of the computing unit panel is maintained and its overall outside dimensions are not substantially changed with or without the removable memory in place. The removable memory may have ribbing or knurling to assist in inserting and removing the removable memory from the memory receptacle.

The computing unit panel may have attachments 61 to match attachments found on the computing unit panel support structure or the inside surface of the bag's front wall.

There may be additional plugs 84 for batteries, peripherals, such as earphones or microphone, or other controls of any sort on the computing unit panel back side, top, bottom or side edges. The plugs may be aligned and positions to match lining fixtures such as pockets, pocket openings, holding straps or wire covers found on the inside surface of the bag.

The computing unit panel may have one or more sound outlets 85 on its top edge. The sound outlets may be associated attachments 86 to secure the outlet to complimentary attachments on a matching opening in the bag's top wall. The attachments may be snaps or channels and may be one or more attachments or may form a perimeter around the speaker outlet. The speaker outlets may form a seal between the computing unit and the bag and this seal may form part of an assembly which includes the attachments.

The invention claimed is:
1. A computer comprising:
   a) a bag with a front wall wherein the front wall has an inside surface, an outside surface, a top end and a bottom end;
   b) a display panel pivotally attached to the bag near the top end of the front wall;
   c) a computing unit support structure attached to the inside surface of the bag's front wall;
   d) a computing unit panel fitting the support structure; and e) an electrical connections extending from the computing unit panel through the bag's front wall to the display panel and connecting them electrically.

2. The computer of claim 1, wherein the computing unit panel includes a plug including a recessed area to accommodate a matching plug from the display panel so that the computing unit panel overall outside dimensions are not substantially changed with or without the electrical connection in place.

3. The computer of claim 1 further comprising one or more removable memory inserts wherein the memory insert is shaped to fit a memory receptacle so the computing unit panel overall outside dimensions are not substantially changed with or without the removable memory in place.

4. The computer of claim 1, wherein the computing unit panel is removable from the bag.

5. The computer of claim 1, wherein the display panel is removable from the bag.

6. The computer of claim 1 further comprising a manual character input device attached to the outside surface of the bag's front wall and electrically connected to the computing unit panel.

7. The computer of claim 6 wherein the manual character input device is pivotally attached to the bag front.

8. The computer of claim 6 wherein the manual character input device is removable from the bag.

9. The computer of claim 6, wherein the computing unit panel includes a plug with a recessed area to accommodate a matching plug from the manual character input device so that the computing unit panel overall outside dimensions are not substantially changed with or without the electrical connection in place.

10. The computer of claim 1, wherein the bag has an electrical connection opening in the front wall and/or computing unit support structure leading between the inside mounted computing unit panel and the outside mounted display panel.

11. The computer of claim 1, wherein the bag has an electrical connection opening in the front wall and/or computing unit support structure leading between the inside mounted computing unit panel and the outside mounted manual character input device.

12. The computing device of claim 1, wherein the bag is further comprised of a top wall attached to the bag at a junction of the top and front walls, the top wall including a support structure configured to hold the computing unit panel to the bag.

13. A computing device for mobile use comprising:
a) a bag comprised of a front wall wherein the front wall has an inside surface, an outside surface, a bottom end and a top end; including a computer equipment storage area on a portion thereof;
b) a display panel pivotally attached to the bag wherein the display panel is positioned at a top of the computer equipment storage area proximal to the top end of the bag front wall and oriented to pivot the display panel into and out of the computer equipment storage area;
c) a computing unit panel comprised of a front side, a back side, a top edge and at least one side edge, the computing unit panel being attached to the inside surface of the front wall of the bag wherein the computing unit panel acts as a rigid support for the front wall of the bag and facilitates the storage of the display panel in the computer equipment storage area on the outside of the front wall of the bag; and
d) an electrical connection, the electrical connection configured to electrically connect the display panel to the computing unit panel.

14. The computing device of claim 13 wherein the computing unit panel is removably attached to the bag.

15. The computing device of claim 13 wherein the bag is further comprised of a computing unit panel support structure on the inside surface of the front wall, the support structure configured to hold the computing unit panel to the bag.

16. The computing device of claim 13 wherein the computing unit panel renders the bag front wall flat.

17. The computing device of claim 13 wherein the computing unit panel is further comprised of at least one memory receptacle, wherein the memory receptacle is configured to hold a removable memory.

18. The computing device of claim 17 further comprising at least one removable memory, the removable memory configured to match and install into the memory receptacle.

19. The computing device of claim 13 wherein the display panel is removably attached to the bag.

20. The computing device of claim 13 wherein the display panel is further comprised of a front side including a display, wherein the display faces away from the bag front when the display panel is stored parallel to the computer equipment storage area.

21. The apparatus of claim 13, further comprising a manual control on the display panel.

22. The computing device of claim 21 wherein the manual control in located on the back side of the display panel.

23. The computing device of claim 13 wherein the computing unit panel is further comprised of an electrical connection, the electrical connection configured to provide a conduit to electrically connect the computing unit panel to computer equipment attached to the outside of the front wall of the bag.

24. The computing device of claim 13 wherein the computing unit panel is further comprised of at least one electrical connection, the electrical connection configured to electrically connect the computing unit panel to at least one of a battery and peripheral.

25. The computing device of claim 13, further comprising one or more electrical connection opening through the front wall to pass electrical wiring from computer equipment mounted on the outside of the front wall through the front wall to an interior of the bag.

26. The computing device of claim 13, further comprising an attachment on the computing unit panel adapted to match and attach to a complimentary attachment on the bag.

27. The computing device of claim 13, wherein the bag is further comprised of a top wall attached to the bag at a junction of the top and front walls, the top wall including a support structure configured to hold the computing unit panel to the bag.

* * * * *